(12) United States Patent
Tsujimoto et al.

(10) Patent No.: US 7,377,540 B2
(45) Date of Patent: *May 27, 2008

(54) AIRBAG UNIT AND CASE OF AIRBAG UNIT

(75) Inventors: Kei Tsujimoto, Hikone (JP); Yoshitaka Matsui, Kanzaki-gun (JP); Wataru Nakazawa, Higashioumi (JP)

(73) Assignee: Takata Corporation, Tokyo (JP)

( * ) Notice: Subject to any disclaimer, the term of this patent is extended or adjusted under 35 U.S.C. 154(b) by 391 days.

This patent is subject to a terminal disclaimer.

(21) Appl. No.: 11/196,257

(22) Filed: Aug. 4, 2005

(65) Prior Publication Data

US 2006/0043700 A1    Mar. 2, 2006

(30) Foreign Application Priority Data

Aug. 25, 2004    (JP)    ............................. 2004-245420

(51) Int. Cl.
B60R 21/16 (2006.01)
(52) U.S. Cl. ................................. 280/728.2; 280/732
(58) Field of Classification Search ............ 280/728.2, 280/732, 741
See application file for complete search history.

(56) References Cited

U.S. PATENT DOCUMENTS

| | | | | |
|---|---|---|---|---|
| 5,295,707 A | * | 3/1994 | Satoh et al. ............. | 280/728.2 |
| 5,374,078 A | | 12/1994 | Amamori et al. | |
| 5,405,163 A | | 4/1995 | Amamori et al. | |
| 5,431,439 A | * | 7/1995 | Amamori et al. .......... | 280/732 |
| 5,613,699 A | * | 3/1997 | Schambre ................. | 280/728.2 |
| 6,161,862 A | * | 12/2000 | Rose et al. .............. | 280/728.2 |
| 6,325,415 B1 | * | 12/2001 | Zelinski et al. .......... | 280/743.2 |
| 6,336,661 B1 | | 1/2002 | Amamori | |
| 6,394,485 B1 | | 5/2002 | Amamori | |
| 6,840,536 B2 | * | 1/2005 | Ahn et al. ............... | 280/728.2 |
| 7,097,196 B2 | * | 8/2006 | Chavez et al. ........... | 280/728.2 |
| 2002/0050701 A1 | * | 5/2002 | Amamori ................. | 280/728.2 |

FOREIGN PATENT DOCUMENTS

| | | |
|---|---|---|
| EP | 1 203 703 | 5/2002 |
| JP | 02155855 | 6/1990 |
| JP | 06293244 | 10/1994 |
| JP | 06293245 | 10/1994 |
| JP | 06298032 | 10/1994 |
| JP | 08225049 | 9/1996 |
| JP | 09076862 | 3/1997 |
| JP | 09226496 | 9/1997 |
| JP | 09315249 | 9/1997 |
| JP | 10100830 | 4/1998 |
| JP | 11034778 | 2/1999 |

(Continued)

*Primary Examiner*—Eric Culbreth
*Assistant Examiner*—Nicole Verley
(74) *Attorney, Agent, or Firm*—Manabu Kanesaka (57) ABSTRACT

A case of an airbag unit has a case body for forming a storage room for accommodating an airbag. The case body has a bottom section, a pair of first side walls, and a pair of second side walls. The case also has a movable component disposed adjacent to an outer surface of one of the first side walls, and retractable toward a base end along the case body in response to an external force applied to the case. One of the first side walls has a plurality of pillars extending upwardly from the bottom to form cut-off portions therebetween extending downwardly from the upper opening.

13 Claims, 9 Drawing Sheets

FOREIGN PATENT DOCUMENTS

| | | |
|---|---|---|
| JP | 11042994 | 2/1999 |
| JP | 11189120 | 7/1999 |
| JP | 2001270408 | 10/2001 |
| JP | 2001270412 | 10/2001 |
| JP | 2003040064 | 2/2003 |

* cited by examiner

AIRBAG UNIT AND CASE OF AIRBAG UNIT

BACKGROUND OF THE INVENTION AND RELATED ART STATEMENT

The present invention relates to an airbag unit for protecting a passenger and the like in a vehicle, and a case for accommodating an airbag of the airbag unit. In particular, the present invention relates to a case capable of deforming in response to an external force to absorb an impact, and relates to an airbag unit including the case.

An airbag unit for protecting a passenger is installed in an instrument panel in a vehicle, and includes a case, an airbag accommodated in the case, an inflator for expanding the airbag, and the like.

Japanese Patent Publication (Kokai) No. 11-42994 has disclosed a structure having a retractable sliding member fastened to a side wall of a case with rivets or bolts. The sliding member has slits extending in a retracting direction, and the rivets or the bolts are fastened on the side wall of the case through the slits. When an object hits an instrument panel, the sliding member retracts by sliding along the side wall of the case.

Patent Document 1: Japanese Patent Publication (Kokai) No. 11-42994

In the airbag unit disclosed in Japanese Patent Publication (Kokai) No. 11-42994, the rivets or the bolts move relative to the slits when the sliding member retracts in response to the hit of the object. However, it is difficult to sufficiently absorb the collision energy of the object during the retraction of the sliding member. If no sliding member is provided, the collision energy is not sufficiently absorbed due to high rigidity of the side wall of the case.

In view of the problems described above, an object of the present invention is to provide a case of an airbag unit including a movable component retractable when an external force is applied, and capable of sufficiently absorbing the collision energy of an object applied to an instrument panel during the retraction of the movable component.

Another object of the present invention is to provide an airbag unit including the case.

Further objects and advantages of the invention will be apparent from the following description of the invention.

SUMMARY OF THE INVENTION

In order to attain the objects described above, according to a first aspect of the present invention, a case of an airbag unit has a storage room for accommodating an airbag and an opening facing a vehicle cabin. The case includes a case body as a base end disposed opposite to the opening having a bottom section, a pair of first side walls, and a pair of second side walls; and a movable component disposed adjacent to an outer surface of one of the first side walls, and retractable toward the base end along the case body in response to an external force applied to the case. The one of the first side walls includes a plurality of cut-off portions cut off from an end portion of the opening, and pillars extending from the vicinity of the base end along the cut-off portions.

According to a second aspect of the present invention, in the case in the first aspect, the movable component is disposed at a position higher than top ends of the pillars, and the movable component is fixed to the top ends of the pillars.

According to a third aspect of the present invention, in the case in one of the first and second aspects, the pillars have stress concentrators for promoting buckling deformation.

According to a fourth aspect of the present invention, in the case in one of the first to third aspects, the pair of second side walls of the case body is linked to the other of the first side walls via connecting portions, and is not directly linked to the bottom section of the case body. Each of the second side walls is deformable around the corresponding connecting portion so as to retract when an external force is applied in a direction toward the base end.

According to a fifth aspect of the present invention, in the case in the fourth aspect, the pair of first side walls and the bottom section of the case body are composed of a bent metallic plate, and the second side walls are composed of another metallic plate.

According to a sixth aspect of the present invention, an airbag unit includes the case according to any one in the first to fifth aspects, an airbag accommodated in the case, and an inflator for expanding the airbag.

In the case and the airbag unit with the case according to the present invention, the collision energy of an object applied to the instrument panel is absorbed by the deformation of the pillars of the case body during the retraction of the movable component in response to the external force generated when the object hits on the instrument panel.

According to the present invention, it is preferable that the movable component is disposed at a position higher than the top ends of the pillars, and that the movable component is fixed to the top ends of the pillars. Accordingly, buckling areas in the pillars during the retraction of the movable component can be expanded, and the absorption of collision energy can be enhanced.

According to the present invention, it is preferable that the pillars have the stress concentrators for promoting buckling deformation. Accordingly, the pillars are surely buckled when the movable component retracts.

According to the present invention, the pair of second side walls of the case body may be linked to the other of the first side walls via the connecting portions, and not linked to the bottom section of the case body. Each of the second side walls may be deformable around the corresponding connecting portion so as to retract when an external force is applied in a direction toward the base end. When an external force is applied by an object to the one of the first side walls of the case having the above-described structure, the second side walls retract while deforming the vicinity of the connecting portions. As a result, the collision energy is absorbed.

The pair of first side walls and the bottom section of the case body may be composed of a bent metallic plate, and the second side walls each may be composed of another metallic plate. The metallic plates are individually cut from a metallic plate such as a metal strip by, for example, blanking, thereby improving yield.

BRIEF DESCRIPTION OF THE DRAWINGS

FIGS. 8(*a*) and 8(*b*) are views showing a side plate before and after deformation, respectively, in a state that an object hits; and FIGS. 9(*a*) to 9(*c*) are perspective views of pillars according to another embodiment of the present invention.

DETAILED DESCRIPTION OF PREFERRED EMBODIMENTS

Hereunder, embodiments for the present invention will be explained with reference to the accompanying.

Figure 5:
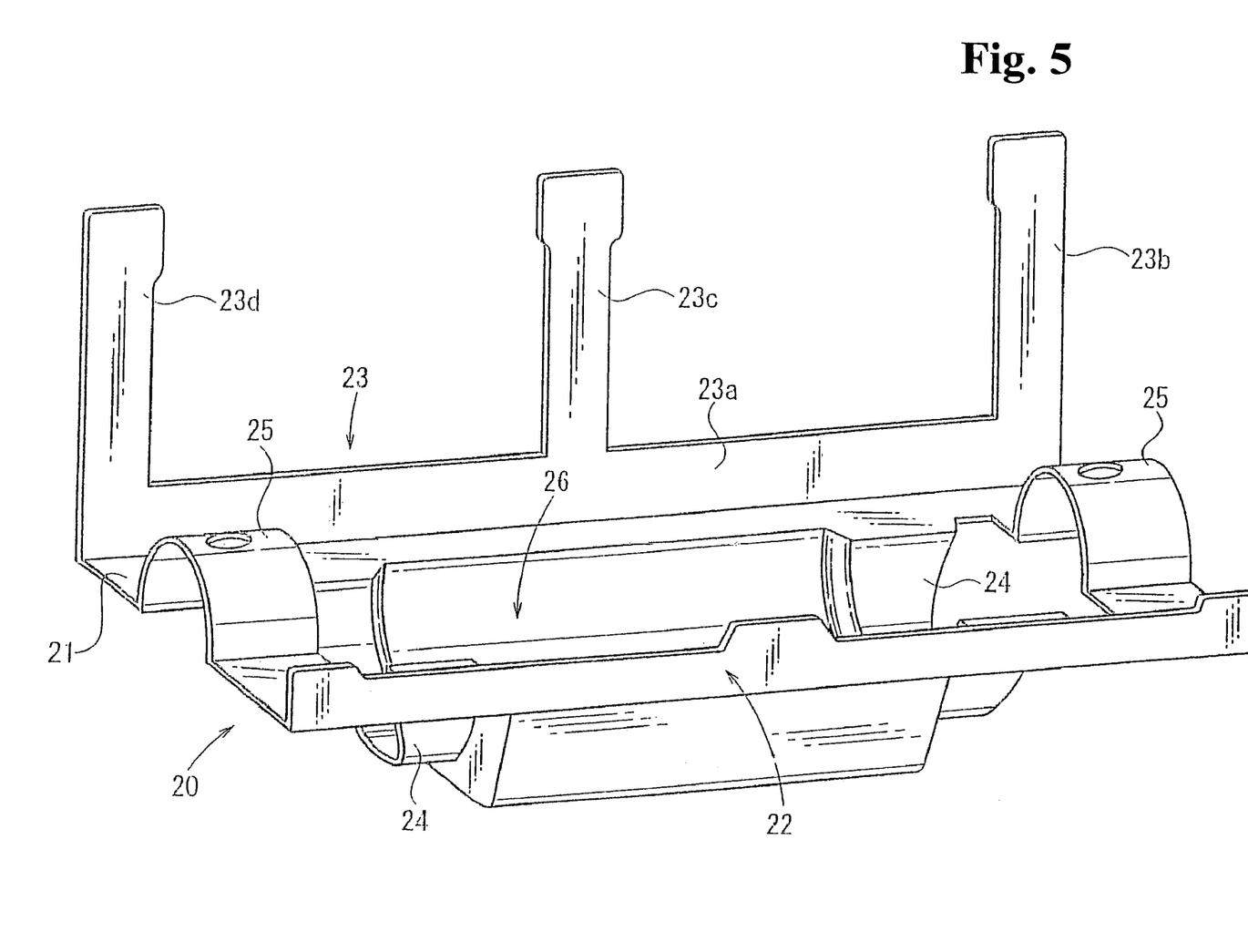
FIG. 5 is a perspective view of a base of the case body.

In the embodiments, the airbag unit is disposed in an instrument panel such that the case has an opening substantially at the top as shown in FIG. 5. Accordingly, an upper side of the drawings as a side of a vehicle cabin corresponds to a top of the airbag unit, and a lower side of the drawings corresponds to the bottom of the airbag unit.

Figure 3:
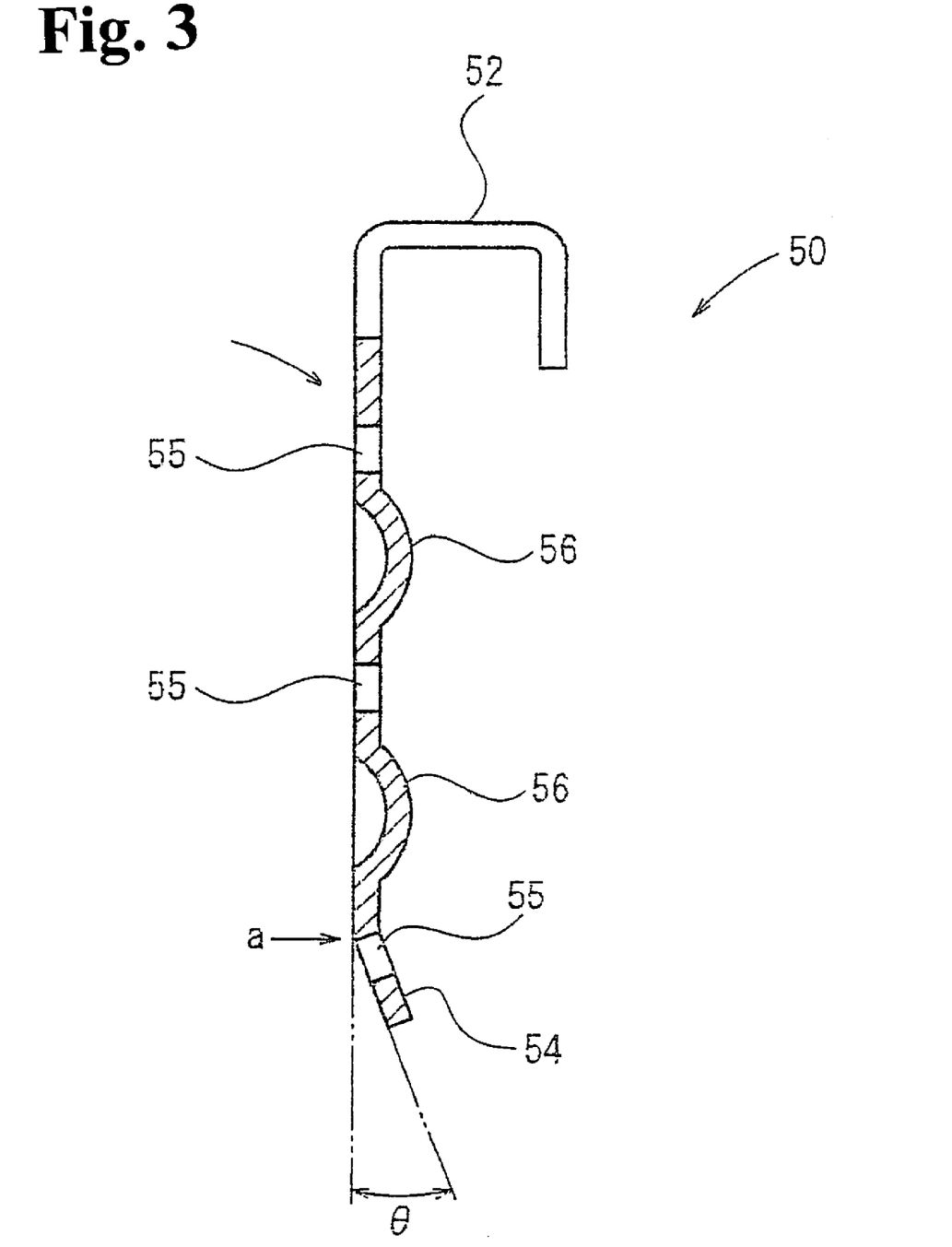
FIG. 3 is a cross-sectional view taken along line 3-3 in FIG. 2.
Figure 4:
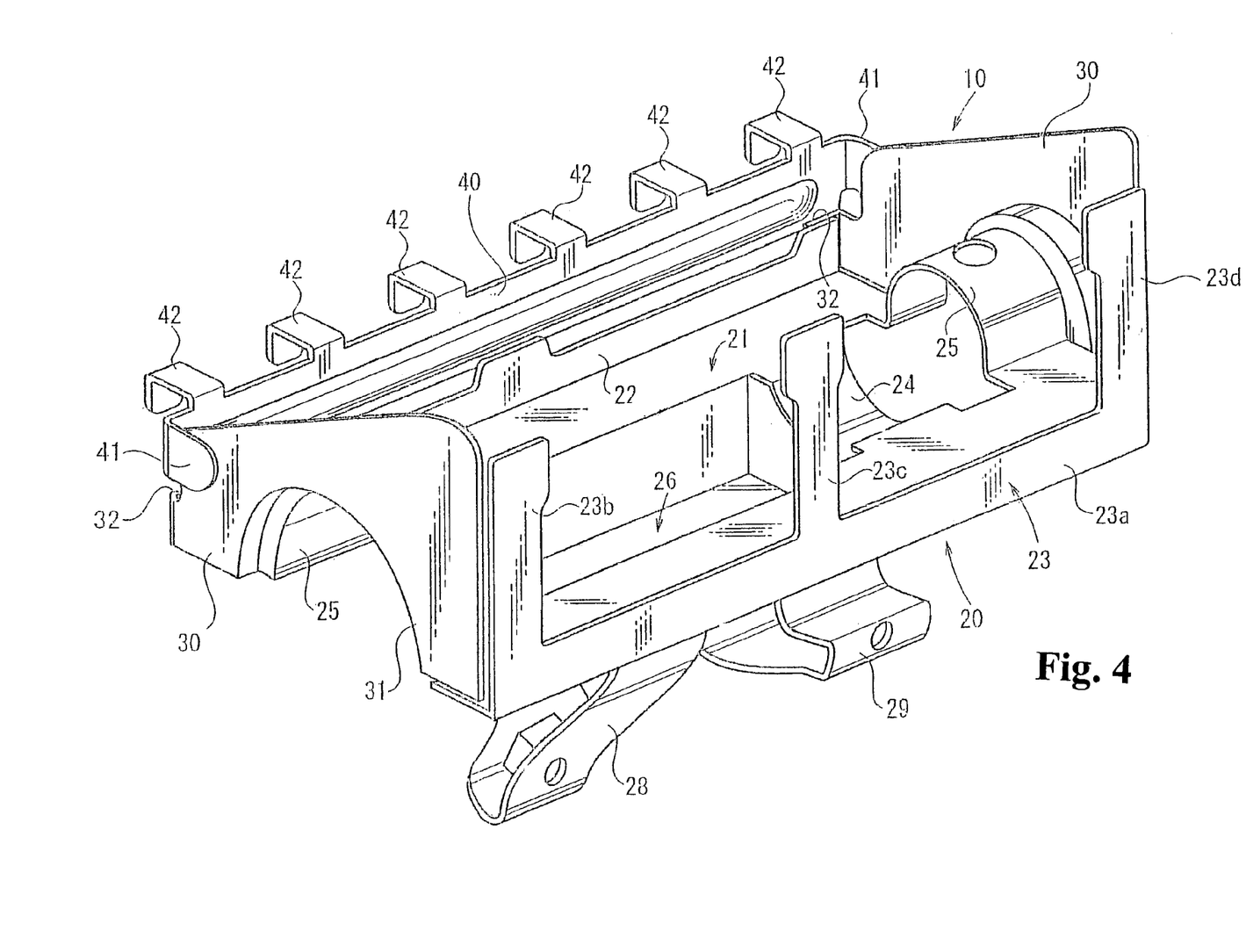
FIG. 4 is a perspective view of a case body.
Figure 6:
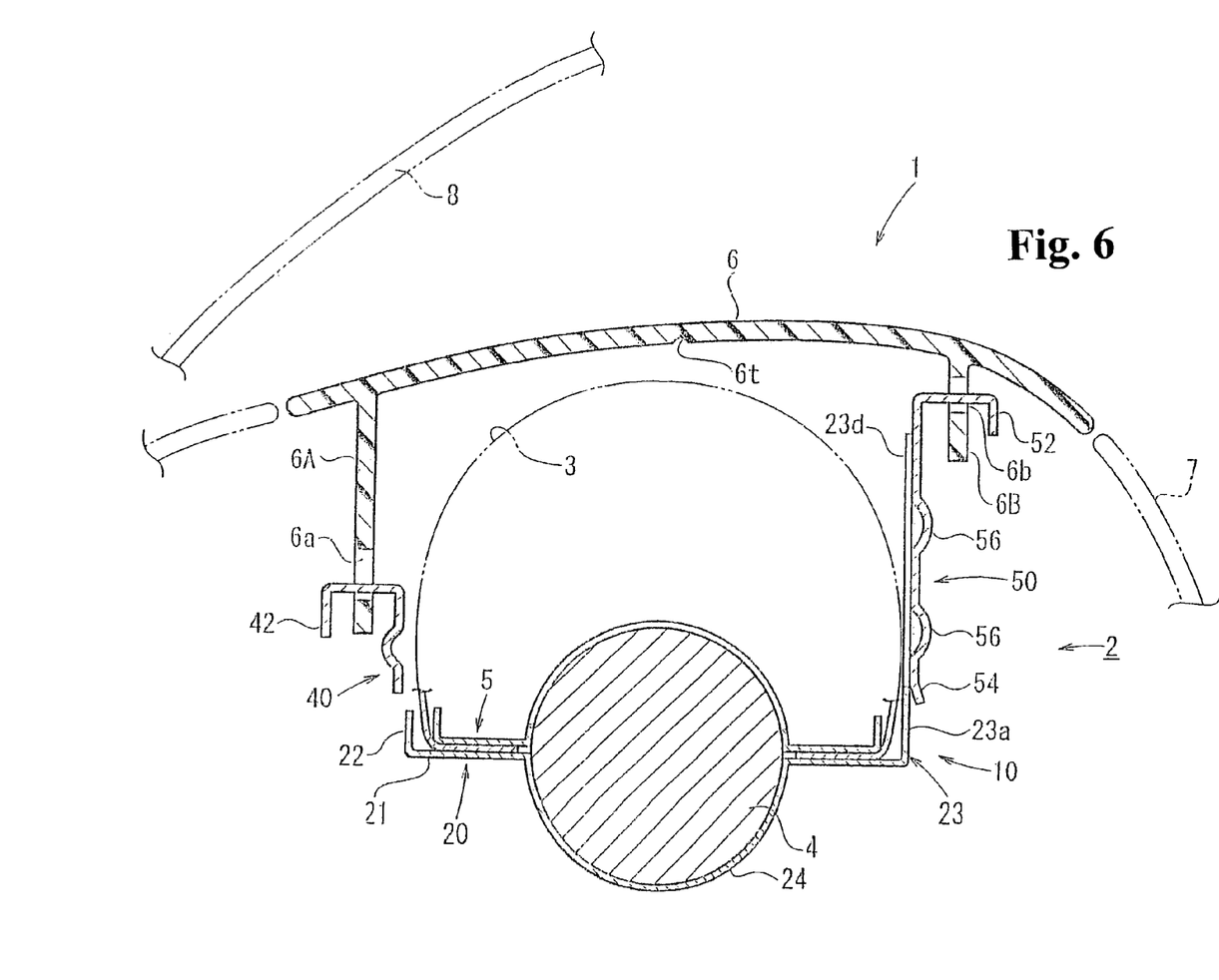
FIG. 6 is a sectional view of the airbag unit.

With reference to FIG. 6, an airbag unit 1 includes a case 2, an folded airbag 3 accommodated in the case 2, an inflator 4 for expanding the airbag 3, an attachment frame 5 for attaching the airbag 3 and the inflator 4 to the case 2, and a lid 6 covering the case 2. The case 2 includes a case body 10 and a movable component 50 attached to the case body 10 shown in FIGS. 2 and 3. With reference to FIGS. 4 and 6, the case body 10 includes a base 20 attached to a hook plate 40 and side plates 30 disposed at left and right sides.

With reference to FIGS. 4 and 5, the base 20 includes a bottom section 21; a wall 22 extending upwardly from a long side of the bottom section 21 as a first side wall; a comb-shaped wall 23 extending upwardly from the other long side of the bottom section 21 as a first side wall; semicircular portions 24 curved downwardly and semicircular portions 25 curved upwardly in the bottom section 21; and a recessed portion 26 formed at the center of the bottom section 21. Brackets 28 and 29 for attaching the airbag unit to a vehicle are fixed to a lower surface of the base 20. The airbag unit 1 is mounted in a vehicle such that the wall 22 is adjacent to a front side of the vehicle and the comb-shaped wall 23 is adjacent to a rear side of the vehicle.

The comb-shaped wall 23 includes a lower portion 23*a* extending along the bottom section 21; pillars 23*b* and 23*d* extending upwardly from both sides of the lower portion 23*a* in the longitudinal direction; and a pillar 23*c* extending upwardly at the intermediate position between the pillars 23*b* and 23*d*. The number and the positions of the pillars are not limited to the embodiment described above. Spaces between the pillars are defined as cut-off portions formed by cutting the comb-shaped wall 23 off from an upper side.

The semicircular portions 24 and 25 have a substantially same radius and are disposed coaxially. The inflator 4 has a cylindrical shape, and is disposed such that end portions thereof are fitted into spaces between the semicircular portions 24 and 25.

As shown in FIG. 6, an end portion of a gas inlet of the airbag 3 and the inflator 4 are held between the attachment frame 5 and the base 20. The attachment frame 5 is fixed to the base 20 with bolts or rivets (not shown). The side plates 30 disposed at the left and the right sides of the case body 10 constitute second side walls of the case body 10. The left and the right sides correspond to the left and the right sides of the vehicle when the airbag unit is installed in the instrument panel.

A semicircular cut-off portion 31 having a radius slightly larger than that of the semicircular portions 25 of the base 20 is provided at a lower end of each side plate 30. An anchoring piece 32 extending from one side of each side plate 30, is bent. The anchoring pieces 32 are overlapped on the outer surface of the wall 22 of the base 20 and fixed to the wall 22 by spot welding such that the side plates 30 are fixed to base 20. No anchoring piece is formed at the other side of each side plate 30, and the other side of each side plate 30 is not linked to the comb-shaped wall 23 (free). The side plates 30 are located outside the bottom section 21 of the base 20.

As described above, the side plates 30 are linked to the base 20 only through the anchoring pieces 32 fixed to the wall 22, and are not directly linked to the comb-shaped wall 23. Moreover, the side plates 30 are located outside the bottom section 21. Therefore, when a downward external force is applied to the side plates 30, the side plates 30 are deformed around the anchoring pieces 32 such that portions adjacent to the comb-shaped wall 23 are pressed downwardly.

The hook plate 40 extends along the wall 22 above the wall 22. Anchoring pieces 41 extending from both ends of the hook plate 40 in the longitudinal direction are bent. The anchoring pieces 41 are fixed to the side plates 30 by spot welding such that the hook plate 40 is fixed to the side plates 30. A plurality of hooks 42 protrudes from an upper end of the hook plate 40 in the longitudinal direction with a predetermined spacing therebetween. The hooks 42 extend slightly upwardly from the hook plate 40, then bend outwardly from the case body 10, and subsequently bend downwardly.

Figure 1:
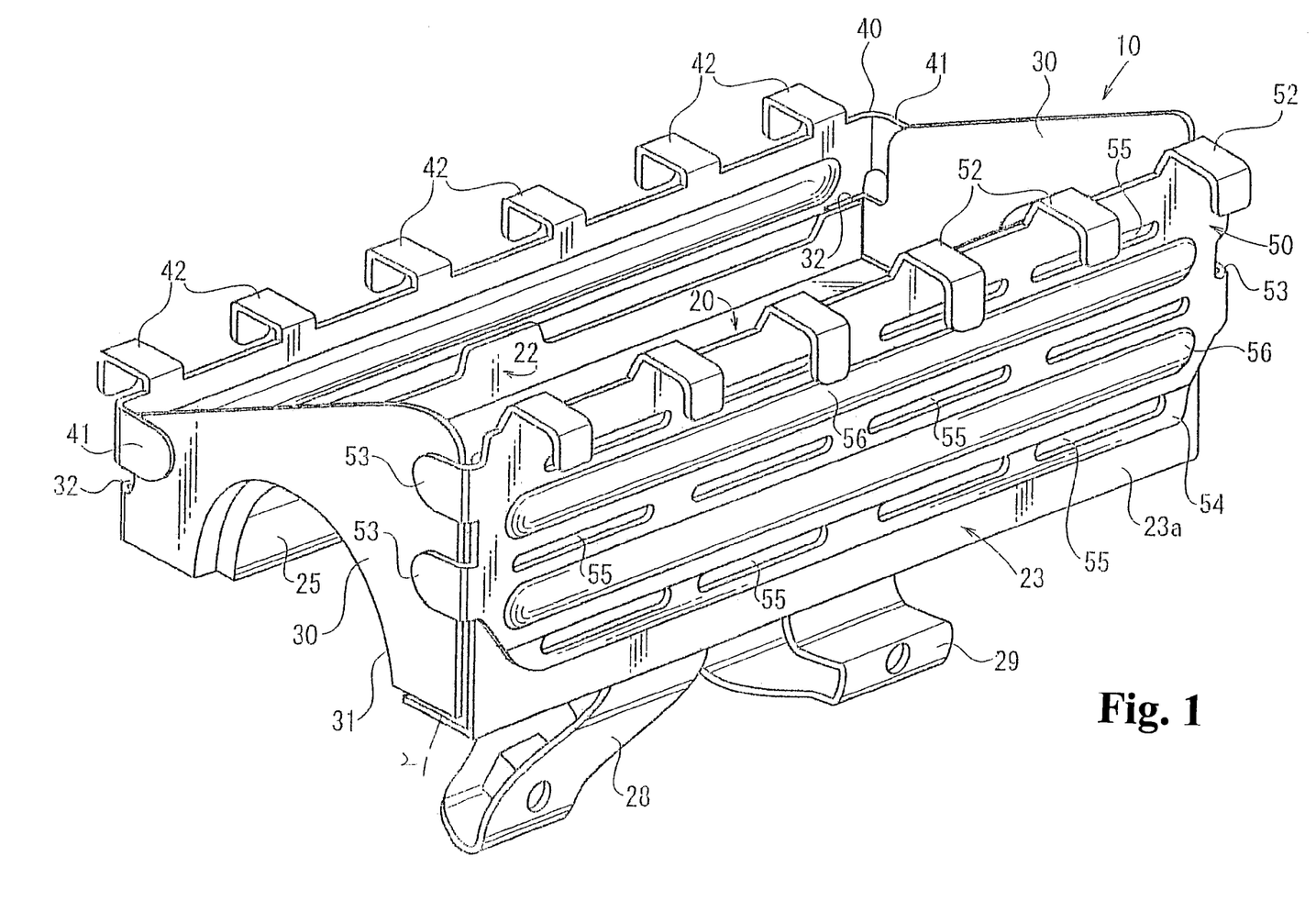
FIG. 1 is a perspective view of a case of an airbag unit for a passenger according to an embodiment of the present invention.
Figure 2:
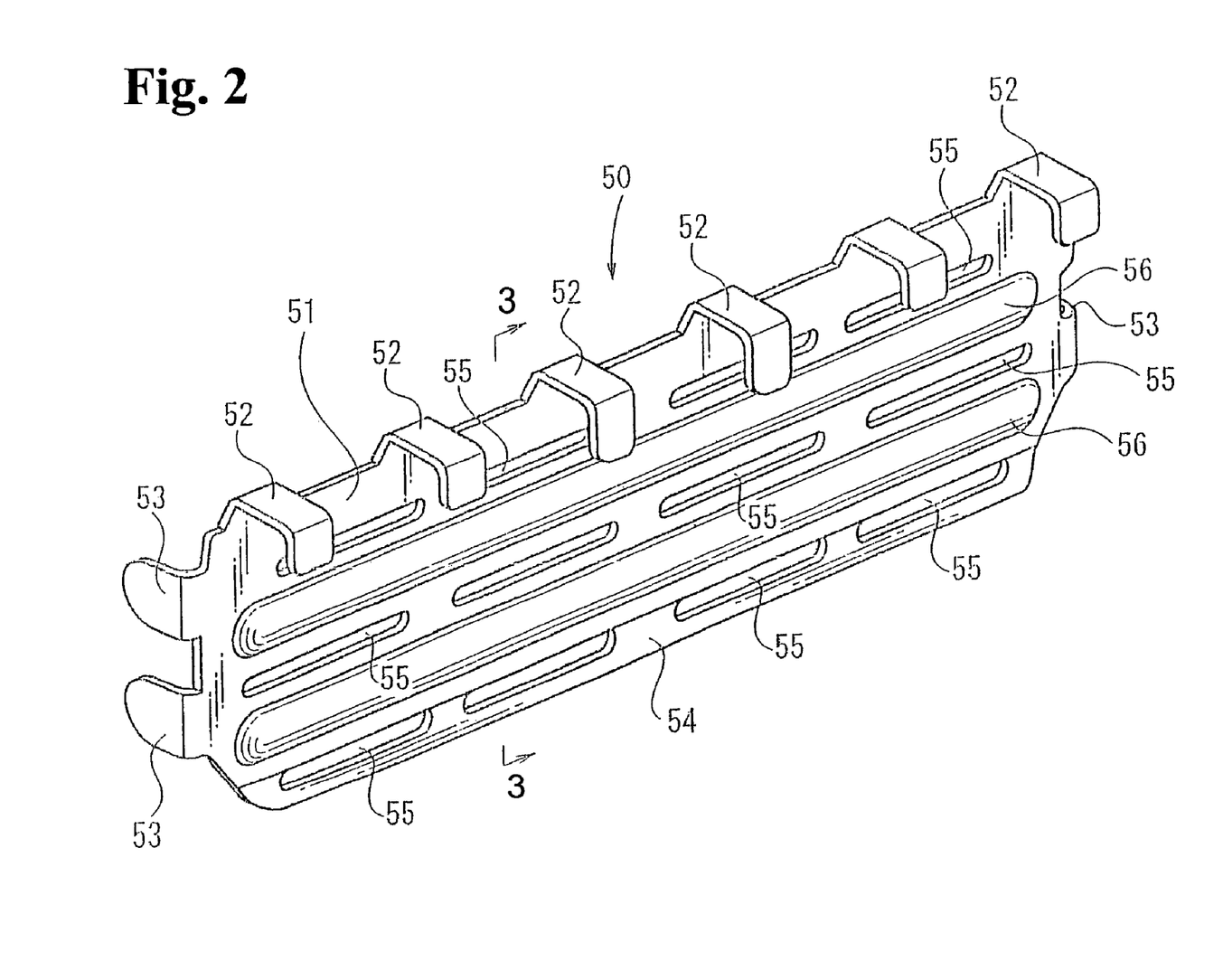
FIG. 2 is a perspective view of a movable component of the case.

With reference to FIG. 2, the movable component 50 includes an approximately rectangular main plate 51; a plurality of hooks 52 protruding from an upper end of the main plate 51; nail-shaped anchoring pieces 53 bent from the left and the right sides of the main plate 51 at an approximately right angle; a deformed section 54 formed at a lower portion of the main plate 51; and slits 55 and ribs 56 formed on the main plate 51. The slits 55 and the ribs 56 extend parallel to the long sides of the main plate 51. Shapes of the slits and ribs are not limited to those described above. The hooks 52 have similar profiles to the hooks 42, and are disposed on the upper end of the main plate 51 in the longitudinal direction with a spacing therebetween.

In this embodiment, two anchoring pieces 53 are disposed at each side of the main plate 51. The number is not limited to the embodiment. The deformed section 54 is formed by bending a lower end portion of the main plate 51 such that the lower end portion is away from the comb-shaped wall 23. The lower end portion of the main plate 51 is bent by an angle $\theta$ along a bending line a (see FIG. 3) parallel to the lower side of the main plate 51 so as to form the deformed section 54. The angle $\theta$ is preferably 90° or less. The deformed section 54 may be formed by curving the lower end portion of the main plate 51.

The movable component 50 is disposed along the outer surface of the comb-shaped wall 23 of the base 20, and the anchoring pieces 53 are disposed along the outer surfaces of the side plates 30. The anchoring pieces 53 are fixed to the side plates 30 by spot welding. In addition, the main plate 51 is fixed to upper portions of the pillars 23*b*, 23*c*, and 23*d* of the comb-shaped wall 23 by spot welding.

As shown in FIG. 6, the lid 6 is attached to the case 2 so as to cover the folded airbag 3 accommodated in the case 2. A leg 6A adjacent to the front side of the vehicle and a leg 6B adjacent to the rear side of the vehicle protrude from the back side of the lid 6, and the hooks 42 and 52 are caught in holes 6*a* and 6*b* formed in the legs 6A and 6B, respectively. The lid 6 includes a tear line 6*t* to be torn when the airbag 3 is expanded upon activation of the inflator 4.

The airbag unit 1 having the above-described structure is installed such that the lid 6 is flush with an instrument panel 7, and the brackets 28 and 29 are fixed to vehicle members (not shown) by bolts and the like.

Figure 7:
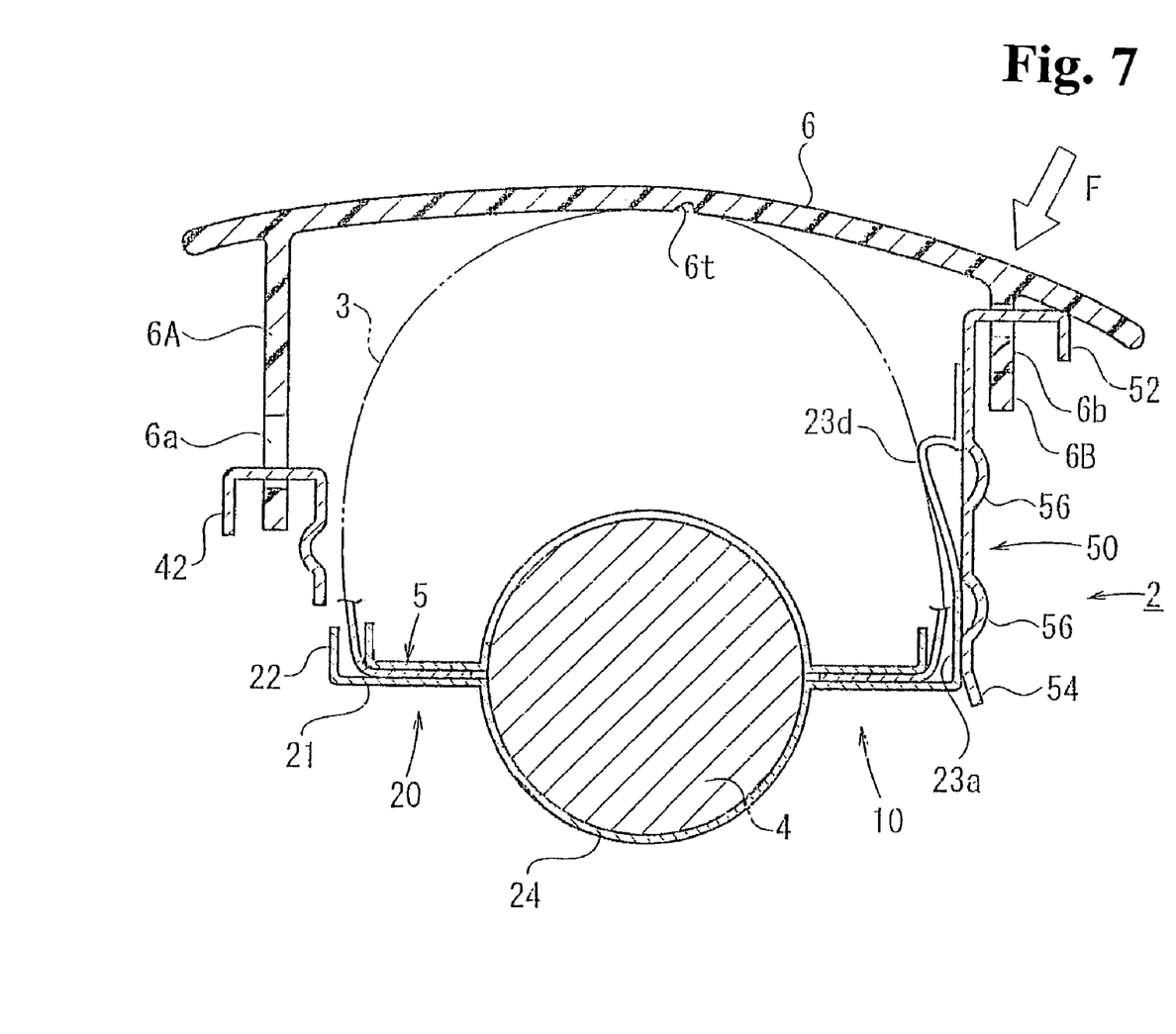
FIG. 7 is a sectional view of the airbag unit in a state that an object hits.

When an external force is applied to the lid 6 of the airbag unit 1 in the vicinity of the movable component 50 due to the hit of an object indicated by an arrow F shown in FIG. 7, the movable component 50 is pushed by the external force and retracts (moves downwardly in this embodiment). At this time, the pillars 23b, 23c, and 23d of the comb-shaped wall 23 are deformed so as to be buckled, and absorb the collision energy. In this embodiment, the movable component 50 is fixed to the upper portions of the pillars 23b to 23d. Accordingly, buckling areas in the pillars are large, and a large amount of the collision energy is absorbed.

Figure 8A:
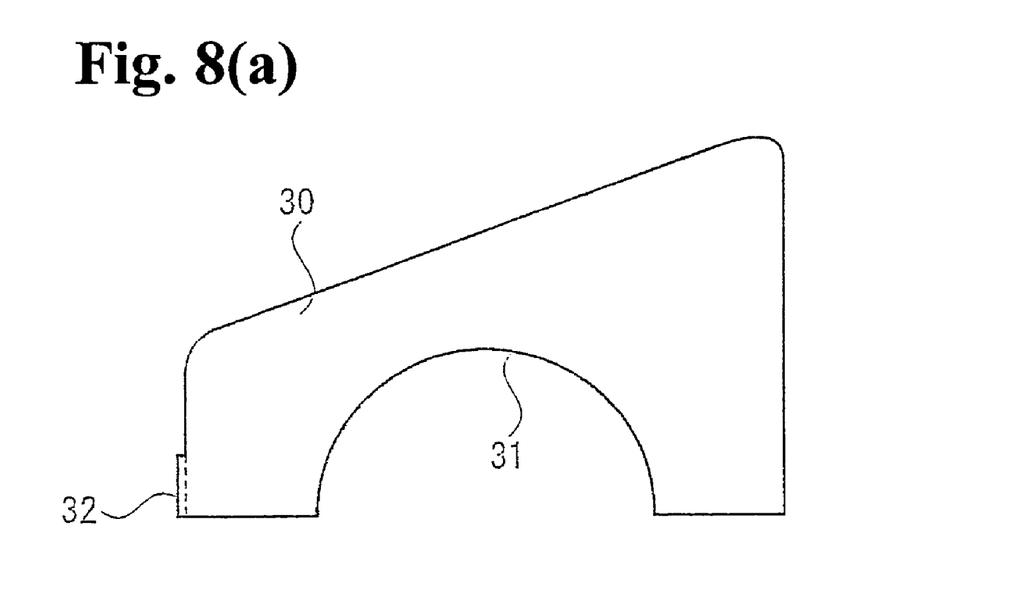
Figure 8B:
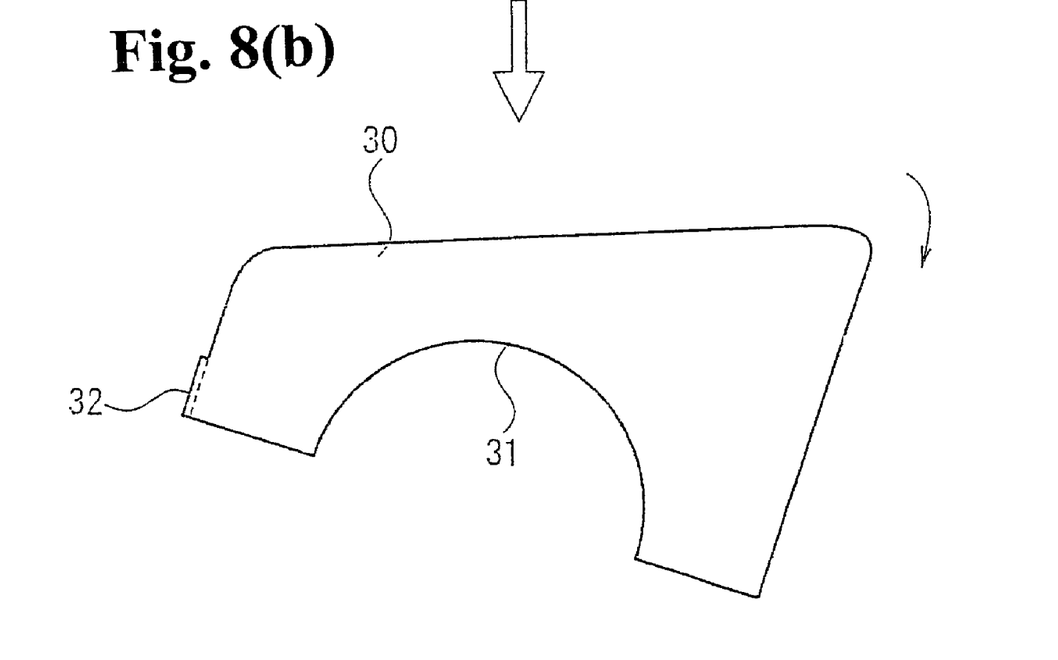

Moreover, as shown in FIGS. 8(a) and 8(b), the side plates 30 are deformed around the bases of the anchoring pieces 32 such that the portions adjacent to the comb-shaped wall 23 are pressed downwardly. The collision energy can also be absorbed by the deformation of the side plates 30.

Even though the movable component 50 moves downwardly, the lower portion 23a of the comb-shaped wall 23 does not move downwardly due to the firm support of the bottom section 21. As a result, the movable component 50 moves downwardly while sliding on the outer surface of the lower portion 23a.

The deformed section 54 is formed in the lower end portion of the movable component 50 such that the deformed section 54 is remote from the comb-shaped wall 23. Accordingly, the movable component 50 is not caught in the upper end of the lower portion 23a, and can smoothly move downwardly. As a result, the pillars 23b to 23d and the side plates 30 can be successfully deformed, and shock occurring when an object hits on the lid in the vicinity of the movable component 50 or on the instrument panel can be sufficiently absorbed.

Figure 9A:
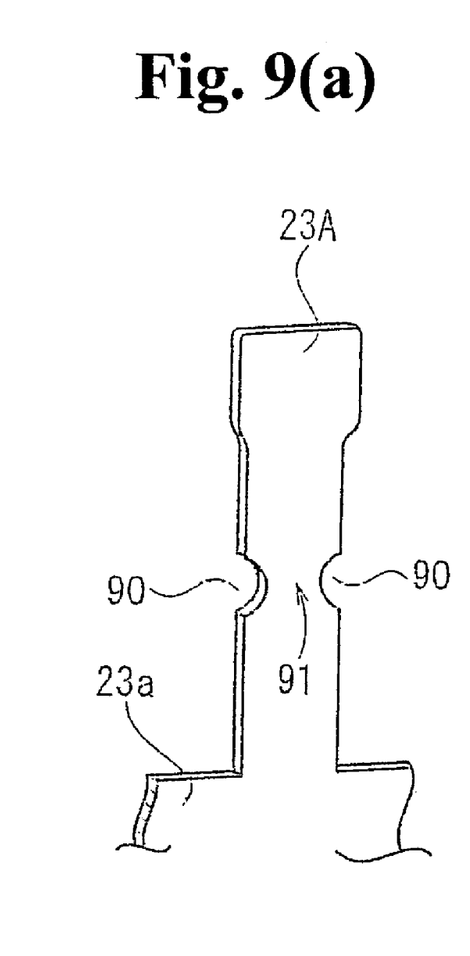
Figures 9B, 9C:
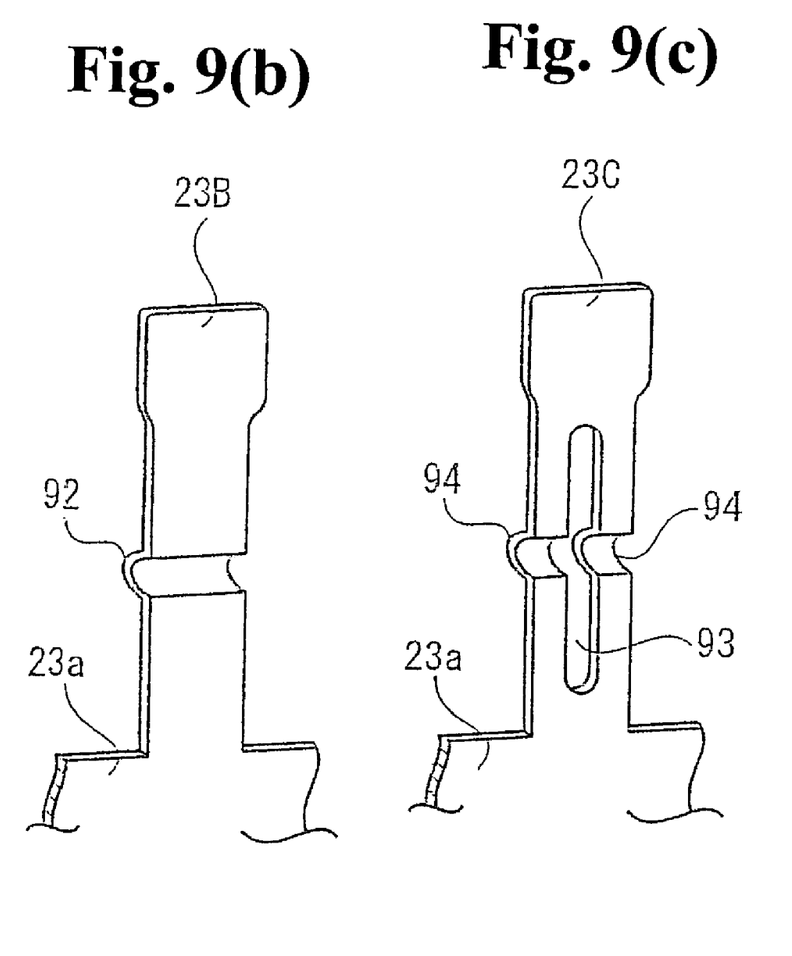

According to the present invention, stress concentrators may be provided in pillars as shown in FIGS. 9(a) to 9(c) so as to ensure predetermined absorption of collision energy by the buckling of the pillars 23b to 23d starting from a predetermined position.

Cut-off portions 90 functioning as stress concentrators 91 are formed at both sides of a pillar 23A shown in FIG. 9(a). A concaved stress concentrator 92 is formed in a pillar 23B shown in FIG. 9(b). Concaved stress concentrators 94 are formed at both sides of a slot 93 formed in a pillar 23C shown in FIG. 9(c) along the longitudinal direction.

In the above-described embodiments, the case body 10 is formed of the base 20 and the side plates 30 composed of separate metallic plates. Since the metallic plates are individually cut from a strip plate, the materials are less wasted compared with a case where a component including the base 20 and the side plates 30 integrated together is cut out. Furthermore, since the hook plate 40 and the base 20 are separate components, the relative height between the hook plate 40 and the wall 22 can also be adjusted.

The above-described embodiments are examples of the present invention, and embodiments other than those shown in the drawings are possible. For example, the comb-shaped wall 23 may be formed only of pillars without the lower portion 23a.

The disclosure of Japanese Patent Application No. 2004-245420 filed on Aug. 25, 2004 is incorporated in the application.

While the invention has been explained with reference to the specific embodiments of the invention, the explanation is illustrative and the invention is limited only by the appended claims.

What is claimed is:

1. A case of an airbag unit, comprising:
   a case body for forming a storage room for accommodating an airbag, said case body having an upper opening, a bottom section, a pair of first side walls, and a pair of second side walls, one of said first side walls having a plurality of pillars extending upwardly from the bottom section to form cut-off portions therebetween, said cut-off portions directly communicating with the upper opening, and
   a movable component disposed along an outer surface of the one of the first side walls with the pillars and fixed to upper portions of the pillars, said movable component being movable toward the bottom section while bending the pillars when an external force is applied to the case.

2. A case of an airbag unit according to claim 1, wherein said movable component extends upwardly beyond the pillars, and is fixed to top ends of the pillars.

3. A case of an airbag unit according to claim 2, wherein said movable component includes anchoring pieces at two sides, said anchoring pieces being connected to the second side walls, respectively.

4. A case of an airbag unit according to claim 3, wherein said movable component includes a lower portion bent in a direction away from the case body without being connected thereto.

5. A case of an airbag unit according to claim 4, wherein said movable component includes hooks at an upper end thereof extending in a direction away from the case.

6. A case of an airbag unit according to claim 1, wherein at least one of said pillars includes a stress concentrator for promoting buckling deformation thereof when the external force is applied thereto.

7. A case of an airbag unit according to claim 6, wherein said at least one stress concentrator includes a notch or curved projection.

8. A case of an airbag unit according to claim 6, wherein said stress concentrator is a curved portion extending perpendicularly to an extending direction of the pillar.

9. A case of an airbag unit according to claim 8, wherein said pillar includes an elongated slot crossing the curved portion.

10. A case of an airbag unit according to claim 6, wherein said stress concentrator is a pair of cut-off portions extending inwardly from two sides of the pillar to reduce a width thereof.

11. An airbag unit comprising the case according to claim 1, an airbag accommodated in the case, and an inflator for expanding the airbag.

12. A case of an airbag unit, comprising:
   a case body for forming a storage room for accommodating an airbag, said case body having an upper opening, a bottom section, a pair of first side walls, and a pair of second side walls, one of said first side walls having a plurality of pillars extending upwardly from the bottom section to form cut-off portions therebetween extending downwardly from the upper opening, and
   a movable component disposed along an outer surface of the one of the first side walls, said movable component being movable toward the bottom section when an external force is applied to the case, wherein said pair of second side walls has connecting portions connected to the other of the first side walls without being directly connected to the bottom section so that the second side walls are deformable around the connecting portions when the external force is applied to the case.

13. A case of the airbag unit according to claim 12, wherein said pair of first side walls and said bottom section are integrally formed of a single metal plate, said second side walls being formed of another metal plate.

* * * * *